United States Patent
Murar et al.

(10) Patent No.: US 11,130,394 B2
(45) Date of Patent: Sep. 28, 2021

(54) VEHICULAR WINDOW TRIM ASSEMBLY AND DECORATIVE MOLDING ASSEMBLY FOR VEHICLE DOOR FRAME

(71) Applicant: JVIS-USA, LLC, Sterling Heights, MI (US)

(72) Inventors: Jason T. Murar, Macomb, MI (US); Donald R. Schaefer, Waterford, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 200 days.

(21) Appl. No.: 16/420,526

(22) Filed: May 23, 2019

(65) Prior Publication Data

US 2020/0369138 A1 Nov. 26, 2020

(51) Int. Cl.
| | |
|---|---|
| *B60J 10/76* | (2016.01) |
| *B60J 5/04* | (2006.01) |
| *B60J 10/15* | (2016.01) |
| *B60J 10/265* | (2016.01) |
| *B60J 10/30* | (2016.01) |

(52) U.S. Cl.
CPC ............ *B60J 10/76* (2016.02); *B60J 5/0402* (2013.01); *B60J 10/15* (2016.02); *B60J 10/265* (2016.02); *B60J 10/30* (2016.02)

(58) Field of Classification Search
CPC ........ B60J 10/76; B60J 5/0402; B60J 10/265; B60J 10/88
USPC ....................................................... 296/1.08
See application file for complete search history.

(56) References Cited

U.S. PATENT DOCUMENTS

| | | | |
|---|---|---|---|
| 4,800,681 | A | 1/1989 | Skillen et al. |
| 4,823,511 | A | 4/1989 | Herliczek et al. |
| 4,853,520 | A | 8/1989 | Hochart et al. |
| 5,024,480 | A | 6/1991 | Petrelli |
| 5,042,200 | A | 8/1991 | Ugawa |
| 5,056,850 | A | 10/1991 | Katcherian et al. |
| 5,168,668 | A | 12/1992 | Mishima et al. |
| 5,174,066 | A | 12/1992 | Dupuy |
| 5,343,609 | A | 9/1994 | McManus |
| 5,356,194 | A | 10/1994 | Takeuchi |
| 5,358,764 | A | 10/1994 | Roberts et al. |
| 5,702,148 | A | 12/1997 | Vaughan et al. |
| 6,260,906 | B1 | 7/2001 | Buchholz |
| 6,279,987 | B1 | 8/2001 | Keeney et al. |
| 6,557,304 | B2 | 5/2003 | Ellis |
| 6,572,176 | B2 | 6/2003 | Davis et al. |

(Continued)

OTHER PUBLICATIONS

United States Court of Appeals, Federal Circuit, in re Nordt Dev. Co., 881 F.3d 1371 (Fed. Cir. 2018), Decided Feb. 8, 2018.

*Primary Examiner* — Jason S Morrow
(74) *Attorney, Agent, or Firm* — Brooks Kushman P.C.

(57) ABSTRACT

A vehicular window trim assembly includes a decorative outer trim member having upper and lower outer boundary mating portions formed on the perimeter of the trim member. The assembly also includes a channel-shaped window seal having a mouth to receive a panel-like member and upper and lower outer boundary mating portions formed on the perimeter of the seal mateable in sealed relationship with the upper and lower outer boundary mating portions, respectively, of the trim member to form an outer boundary. Mating portions of the trim member and the seal are joined together to form an outer boundary.

20 Claims, 6 Drawing Sheets

(56) References Cited

U.S. PATENT DOCUMENTS

| | | |
|---|---|---|
| 6,668,490 B2 | 12/2003 | Hock et al. |
| 6,817,651 B2 | 11/2004 | Carvalho et al. |
| 7,350,849 B2 | 4/2008 | Roush et al. |
| 7,874,104 B2 | 1/2011 | Kimoto et al. |
| 8,186,741 B2 | 5/2012 | Lynam et al. |
| 8,205,389 B1 | 6/2012 | Kesh |
| 8,434,267 B2 | 5/2013 | Bocutto |
| 8,840,170 B2 | 9/2014 | Zimmer et al. |
| 8,919,846 B2 | 12/2014 | Maass |
| 8,978,306 B2 | 3/2015 | Prater et al. |
| 8,979,164 B2 | 3/2015 | Jabra |
| 9,027,284 B2 * | 5/2015 | Murree .................. B60J 10/265 49/495.1 |
| 9,096,114 B2 | 8/2015 | Baratin |
| 9,114,693 B2 | 8/2015 | Prater et al. |
| 9,493,061 B2 | 11/2016 | Goto et al. |
| 9,802,555 B2 * | 10/2017 | Thiel ..................... B60J 10/88 |
| 10,583,726 B2 * | 3/2020 | Nishikawa ............... B60J 10/88 |
| 10,766,433 B2 * | 9/2020 | Tomoyasu ............. B60R 13/04 |
| 2006/0037249 A1 | 2/2006 | Kawamura |
| 2008/0012242 A1 * | 1/2008 | Brocke ................... B60J 10/30 277/637 |
| 2010/0052359 A1 * | 3/2010 | Ellis ........................ B60J 10/88 296/146.1 |
| 2016/0096418 A1 * | 4/2016 | Carter .................... B60J 5/0466 49/472 |
| 2018/0290526 A1 * | 10/2018 | Nishikawa ............... B60J 10/88 |
| 2018/0312048 A1 | 11/2018 | Schaefer et al. |
| 2019/0118732 A1 * | 4/2019 | Tomoyasu ............. B60J 10/265 |
| 2019/0176602 A1 * | 6/2019 | Takeda ..................... B60J 10/21 |
| 2019/0193541 A1 * | 6/2019 | Takeda ..................... B60J 10/50 |
| 2019/0210439 A1 * | 7/2019 | Williamson ........... B60J 10/265 |
| 2020/0079298 A1 * | 3/2020 | Takeda ..................... B60J 10/21 |
| 2020/0086727 A1 * | 3/2020 | Guellec ....................... B60J 1/17 |
| 2020/0171725 A1 * | 6/2020 | Ostwald ................... B29C 45/37 |
| 2020/0369138 A1 * | 11/2020 | Murar ................... B60J 5/0402 |

* cited by examiner

VEHICULAR WINDOW TRIM ASSEMBLY AND DECORATIVE MOLDING ASSEMBLY FOR VEHICLE DOOR FRAME

TECHNICAL FIELD

This invention generally relates to vehicular window trim assemblies and decorative molding assemblies for vehicle door frames.

Overview

There is an ongoing need to reduce the weight of various automotive components. The reduction of weight makes for more fuel efficient vehicles. It is estimated that every 10% reduction in vehicle weight results in a 5% to 7% reduction in fuel usage. Current economic and environmental concerns make the creation of more fuel efficient cars a top priority in the automotive industry.

The use of high performance plastics typically not only reduces the weight of an automotive component, but also provides the additional following advantages:

- minimal corrosion, allowing for longer vehicle life
- substantial design freedom, allowing advanced creativity and innovation
- flexibility in integrating components
- safety, comfort and economy
- recyclability The following three plastics are high performance, automotive plastics which are rigid and relatively stable in a wide temperature range (i.e. −40° F. to 140° F.).

ABS

Acrylonitrile Butadiene Styrene is a copolymer made by polymerizing styrene and acrylonitrile in the presence of polybutadiene. The styrene gives the plastic a shiny, impervious surface. The butadiene, a rubbery substance, provides resilience even at low temperatures (i.e. −40° F.). A variety of modifications can be made to the plastic to improve impact resistance, toughness, and heat resistance. The plastic may suffer from inherent shortcomings in terms of mechanical strength and vulnerability to environmental conditions.

Automotive Applications: automotive body parts, dashboards, wheel covers.

Polycarbonate (PC)

Amorphous polycarbonate polymer offers a unique combination of stiffness, hardness and toughness. It exhibits excellent weathering, creep, impact, optical, electrical and thermal properties. Because of its extraordinary impact strength, it is used for helmets of all kinds and bullet-proof glass substitutes.

Automotive Applications: bumpers, headlamp lenses.

ASA (Acrylonitrile Styrene Acrylate)

Similar to ABS, ASA has great toughness and rigidity, good chemical resistance and thermal stability, outstanding resistance to weather, aging and yellowing, and high gloss.

Automotive Applications: housings, profiles, interior parts and outdoor applications.

Composite strips are typically employed as weatherseals. These weatherseals must perform a variety of functions including the prevention of various contaminants such as moisture, dirt and debris from passing the seal. In motor vehicle applications, the weatherseal must also prevent road, engine, and wind noise from penetrating into a passenger compartment. Additionally, the weatherseal may include trim portions which consumers often demand be color-matched the vehicle.

In the motor vehicle industry, it is common practice to extrude sealing sections either from a black thermosetting polymeric material, which incorporates one or more fillers, or from a thermoplastic material. However, in each case, there is often a requirement for the extrusion to have its characteristics changed. For example, in order to stiffen the thermosetting polymeric material of a U-sectioned edge trim or door seal, a metallic carrier is often incorporated within the extrusion.

There is also an ongoing need to make automobiles more aerodynamic (i.e. less drag or low coefficient of drag) to improve fuel economy and enhance vehicle performance.

There is also an ongoing need to provide improved exterior seals especially for exterior decorative surround molding assemblies for automotive windows.

Figure 1:
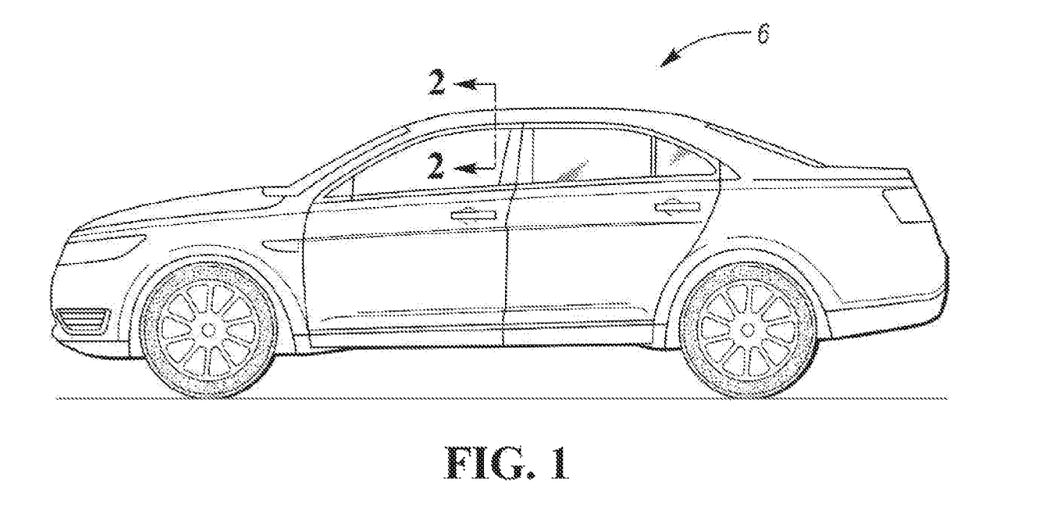
FIG. 1 is a side schematic view of a passenger vehicle or automobile.
Figure 2:
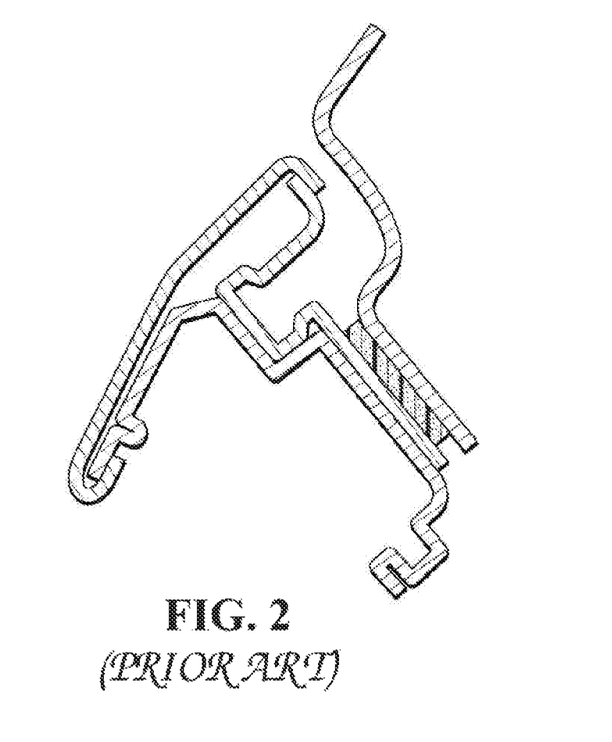
FIG. 2 is a sectional view taken along lines 2-2 of FIG. 1, partially broken away, of a prior art metal vehicular window trim assembly adhesively secured to vehicle door frame.
Figure 3:
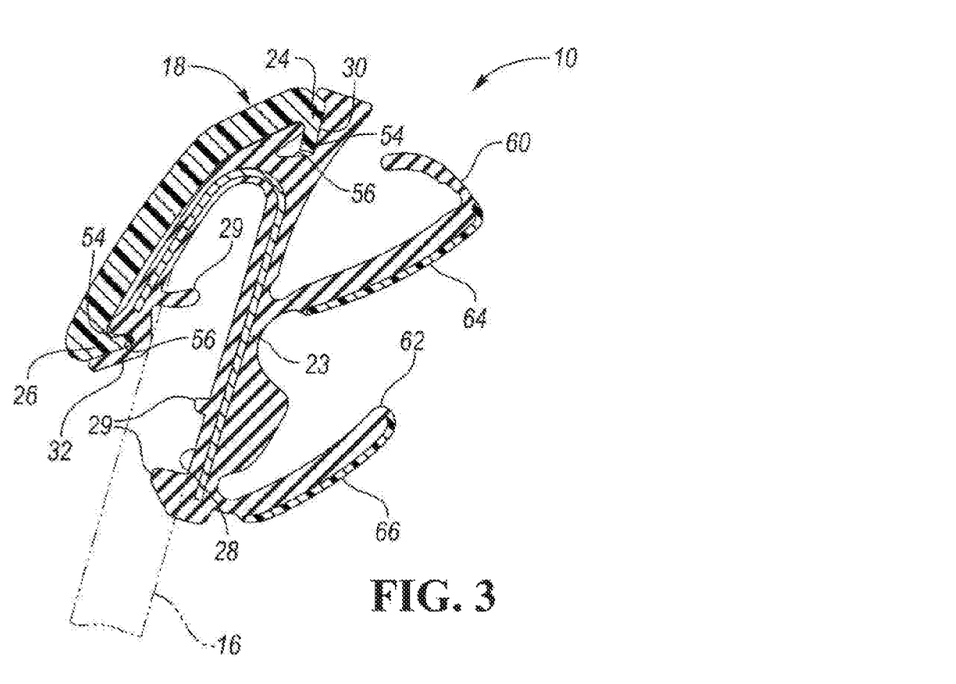
FIG. 3 is a side sectional view of a window trim assembly constructed in accordance with at least one embodiment of the present invention with a pane of glass indicated by phantom lines held or retained within a window seal of the assembly.

As described in U.S. Pat. No. 5,702,148 and generally referring now to FIGS. 1 and 2, conventionally, automotive window surround moldings are comprised of multiple pieces, and provide little or no structural support for sealing the window which they are associated with. Further, conventional sealing systems used with translational window panes in automobiles are directly attached to a weld flange associated with the window aperture, or to channels which are attached to the structure surrounding the window aperture prior to installation of the glass run.

Glass run channels are used in automotive vehicles and the like to support window panes which translationally move between open and closed positions. The glass run channel guides the window pane along the front and rear vertical edges during translational movement between the open and closed positions, and supports the window pane so as to form a seal between the window pane and the vehicle door or body structure. The seal is required to prevent the outside elements from entering the passenger compartment and contacting either the passenger or the interior of the vehicle.

The structural integrity of the glass run channel must be sufficient to prevent the window pane from experiencing significant movement other than in the intended translational direction. The glass run channel must also allow the window pane translational movement without undue resistance.

Decorative moldings are often used in association with glass run channels to improve the appearance of the exterior edge of the glass run channel. Some moldings are attached to or molded into the exterior portion of the seal, while others are fastened to the structure of the door or body surrounding the window. Under either method, the glass run channel is attached directly to the weld flange or to channels which are attached to the surrounding structure in an additional operation during final assembly. Generally, multiple operations are required to fasten the prior art glass run channel, belt weather strip, and decorative molding.

Trim members may be metallic trim members. Metallic trim members may be comprised of a nickel chromium alloy and/or may be comprised of a nickel containing stainless steel alloy. Trim members may be referred to as chrome upper brights or chrome caps, stainless steel members.

Often the prior art decorative moldings are comprised of two or more pieces. For example, one piece is attached along the belt line of the window opening, a second piece is attached along the B pillar, top of window, and A pillar areas of the window opening, and a third piece of molding is attached near the A pillar/Belt line junction where an exterior rear view mirror is often positioned. Further, even when the decorative molding is incorporated in the glass run channel by insert molding (or alternate attachment methods), there are still multiple pieces required for the belt line area, the B pillar/top of window/A pillar, and the mirror area.

Each additional piece which must be assembled to the vehicle along the final assembly line has a greater assembly cost associated with it than if the parts can be assembled into a larger sub-assembly remote from the final assembly line.

Another disadvantage of attaching multiple pieces to the vehicle, verses having a sub-assembly, is that the quality of the fit and finish of the pieces is less controlled. For example, the length of the weld flange around the entire window aperture must be controlled to provide a uniform appearance and proper sealing of the glass run channel and belt line seal if attached directly to the flange. There is an inherent cost associated with controlling this entire edge during stamping and forming. Also, there is an additional cost associated with the tooling fixtures which are required during assembly of the door inner panel to the door outer panel to ensure that the weld flange is uniform. It is generally accepted within the industry that reducing the number or length of areas which have "critical" or "significant" dimensional characteristics reduces the cost of the component and provides a more robust design.

The following U.S. patent documents are related to the present invention: U.S. Pat. Nos. 4,800,681; 4,823,511; 4,853,520; 5,024,480; 5,042,200; 5,056,850; 5,168,668; 5,174,066; 5,343,609; 5,356,194; 5,358,764; 5,702,148; 6,260,906; 6,279,987; 6,557,304; 6,572,176; 6,668,490; 6,817,651; 7,350,849; 7,874,104; 8,186,741; 8,205,389; 8,434,267; 8,840,170; 8,919,846; 8,978,306; 8,979,164; 9,096,114; 9,114,693; 9,493,061; 2006/0037249; and 2018/0312048;

In prior motor vehicle window weatherseal constructions, a variety of materials have been used, such as thermoplastics, thermosets and metal. While each of these materials is separately recyclable, the construction of prior weatherseals has precluded economically viable separation of the various constitutents for recycling.

Therefore, a need exists for a window seal assembly that can accommodate the spectrum of required seal functions, while providing an aesthetically pleasing appearance. The need further exists for the seal assembly to reduce installation time and complexity, thereby reducing installation costs. There is also a need to overcome the obstacles to recycling as presented by the traditional use of rubber, plastic and metal combinations within a given weatherseal.

SUMMARY OF EXAMPLE EMBODIMENTS

An object of at least one embodiment of the present invention is to provide a lightweight, low cost, vehicular window trim assembly to seal the vehicle interior from weather, dirt, debris and noise.

Another object is to provide such an assembly wherein injection molding is utilized to produce parts of relatively complex shape with precise dimensional control.

In carrying out the above objects and other objects of at least one embodiment of the present invention, a vehicular window trim assembly is provided. The assembly includes a decorative outer trim member having upper and lower outer boundary mating portions formed on the perimeter of the trim member. A channel-shaped window seal has a mouth to receive a panel-like member and upper and lower outer boundary mating portions formed on the perimeter of the seal mateable in sealed relationship with the upper and lower outer boundary mating portions, respectively, of the trim member to form an outer boundary. Mating portions of the trim member and the seal are joined together to form an outer boundary.

The outer trim member may include a polymer substrate and a metallic layer coated thereon.

The outer trim member may be metal-plated.

The metallic layer may be chrome-plated.

The polymer may be a thermoplastic.

The metallic layer may completely cover the polymer substrate.

The metallic layer may be an electroplated layer.

The thermoplastic may be ABS.

The upper and lower outer boundary mating portions of the trim member may be joined to the upper and lower outer boundary mating portions of the seal, respectively, by a complimentary rib and groove sealed mating relationship to withstand vibration and extreme weather conditions.

Each rib may be inserted into its groove for snap-fit engagement to retain the trim member on the window seal.

Further in carrying out the above objects and other objects of at least one embodiment of the present invention, a decorative molding assembly for a vehicle door frame having a window opening for a translating window pane moveable between an open position and a closed position is provided. The assembly includes a decorative outer trim member having upper and lower outer boundary mating portions formed on the perimeter of the trim member. A channel-shaped window seal has a mouth to receive a window pane and upper and lower outer boundary mating portions formed on the perimeter of the seal mateable in sealed relationship with the upper and lower outer boundary mating portions, respectively, of the trim member to form an outer boundary. Mating portions of the trim member and the seal are joined together to form an outer boundary.

The outer trim member may include a polymer substrate and a metallic layer coated thereon.

The outer trim member may be metal-plated.

The metallic layer may be chrome-plated.

The polymer may be a thermoplastic such as ABS.

The metallic layer may completely cover the polymer substrate.

The metallic layer may be an electroplated layer.

The upper and lower outer boundary mating portions of the trim member may be joined to the upper and lower outer boundary mating portions of the seal, respectively, by a complementary rib and groove sealed mating relationship to withstand vibration and extreme weather conditions.

Each rib may be inserted into its groove for snap-fit engagement to retain the trim member on the window seal.

Other technical advantages will be readily apparent to one skilled in the art from the following figures, descriptions and claims. Moreover, while specific advantages have been enumerated, various embodiments may include all, some or none of the enumerated advantages.

DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 3-11, there are illustrated multiple embodiments of a vehicular window or molding assembly of the present invention. The embodiments of FIGS. 3-11 are provided for a driver's side door.

In all embodiments, a decorative molding assembly, generally indicated at 10, (or 12 for FIGS. 4-11) for a vehicle door frame having a window opening (see FIG. 1) for a translating window pane indicated in phantom at 16, moveable between an open position and a closed position is provided. The assembly 10 includes a decorative all plastic outer trim member, generally indicated at 18, in FIG. 3. The assembly 12 includes a chrome-plated trim member, generally indicated at 20 in FIGS. 4-11, joined to a window pane seal, generally indicated at 22.

The seal 22 may include a reinforcing carrier 23 embedded during the extrusion process used to form the seal 22. The carrier 23 can be formed of a variety of materials including plastic, thermoplastic or thermosetting materials, including but not limited to plastic, TPE, EPDM, or any combination thereof. The thermoplastic materials can include polyethylene, EVA, PVC or polypropylene. Suitable vulcanized or cross-linked (thermosetting) polymeric materials include EPDM and modified EPDM.

The carrier 23 can have a relatively rigid section and a relatively soft or resilient section. That is, the carrier 23 can exhibit one or more durometer hardness. The carrier 23 can include a reinforcing member such as a wire or metal carrier, which may be of known construction (such as knitted wire, lanced and stretched, slotted, solid (continuous) or stamped metal). It is also contemplated the carrier 23 can include a thermoplastic section and a thermoset section, wherein each section has a unique rigidity. Further, the carrier 23 can be formed at differing thicknesses to provide differing amounts of rigidity. It is contemplated the carrier 23 can have any of a variety of cross-sections, wherein typical cross-sections include "U" shaped, "J" shaped, "L" shaped or planar. The decorative outer trim members 10 and 12 have upper and lower outer boundary mating portions 24 and 26, respectively, formed on their perimeters.

The channel-shaped window seal 22 has a mouth 28 to receive the panel-like member 16. The seal 22 has sealing lips 29 formed about the mouth 28. The seal 22 also has upper and lower outer boundary mating portions 30 and 32, respectively, formed on the perimeter of the seal 22 mateable in sealed relationship with the upper and lower outer boundary mating portions 24 and 26, respectively, of the trim member 20 to form an outer boundary. The mating portions 24 and 26 of the trim member 20 and the mating portions 30 and 32 of the seal 22 are joined together to form the outer boundary.

Figure 4:
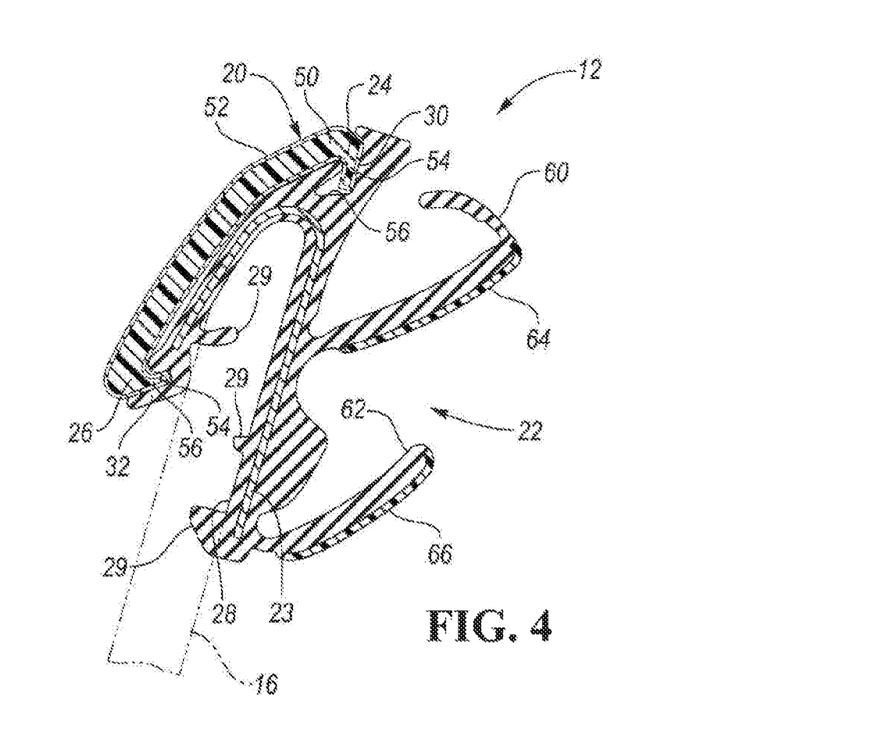
FIG. 4 is a view similar to the view of FIG. 3 wherein a decorative outer trim member of the assembly is metal-plated.
Figure 5:
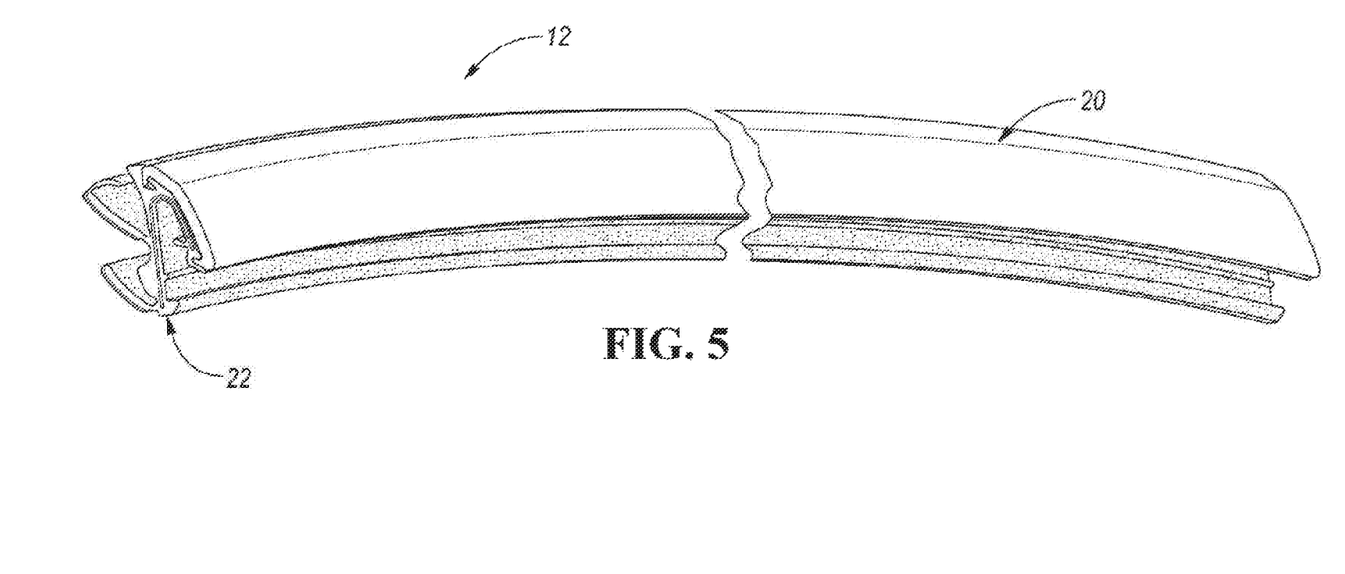
FIG. 5 is a side perspective view, partially broken away, of a trim assembly of at least one embodiment of the present invention for use in a driver's side door frame.
Figure 6:
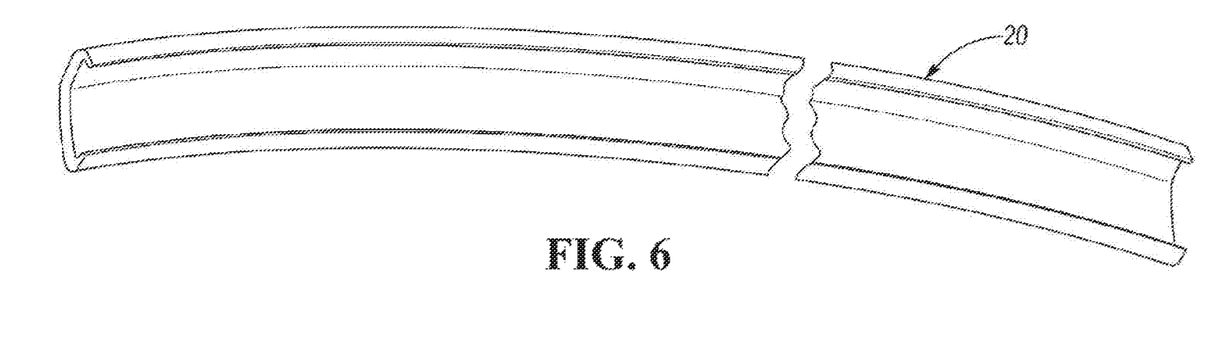
FIG. 6 is a side perspective view of the inside surface of a trim member of FIG. 6.
Figure 7:
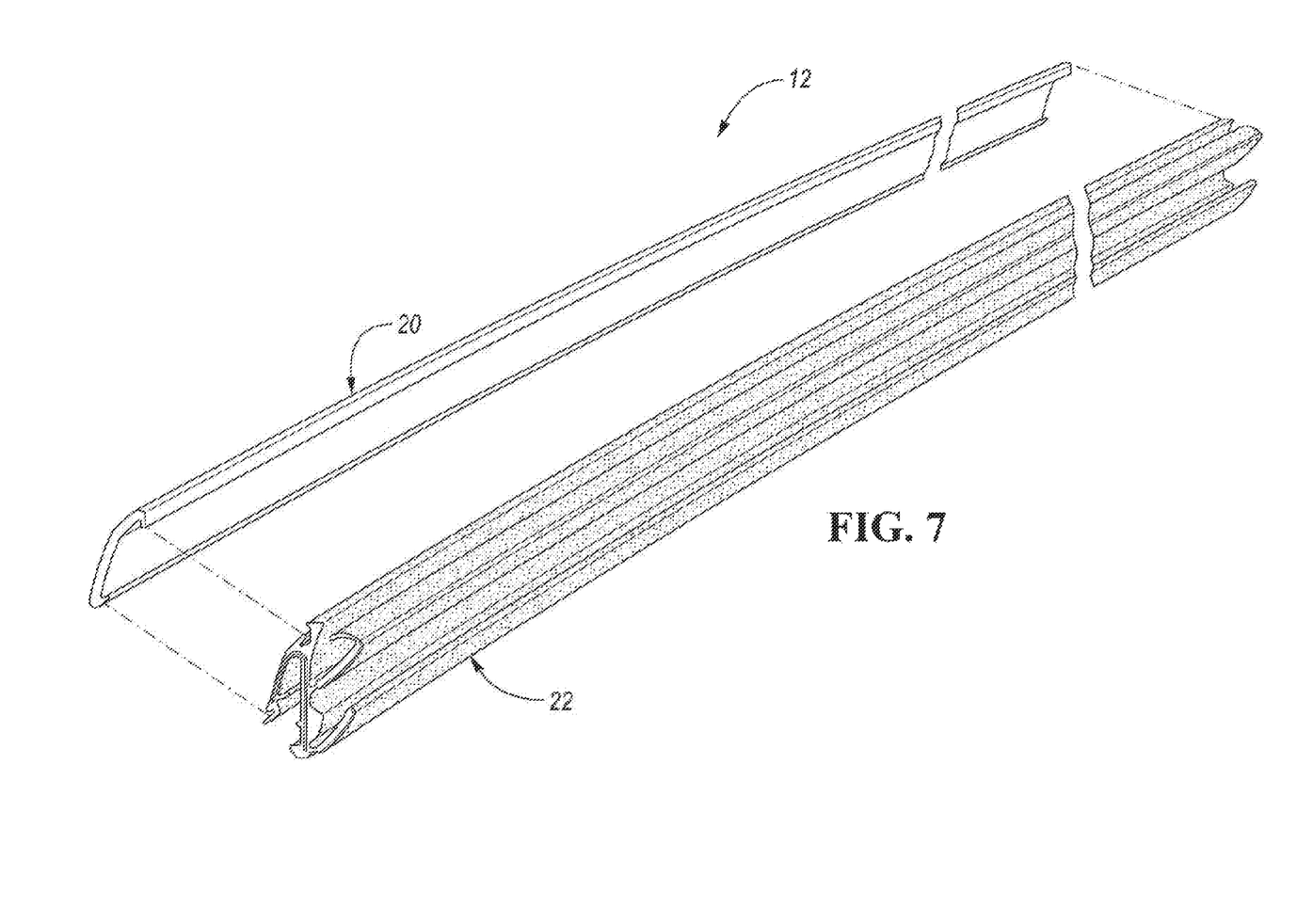
FIG. 7 is a exploded perspective view, partially broken away, of the trim assembly of FIG. 5 but from a different viewing angle.
Figures 8, 9:
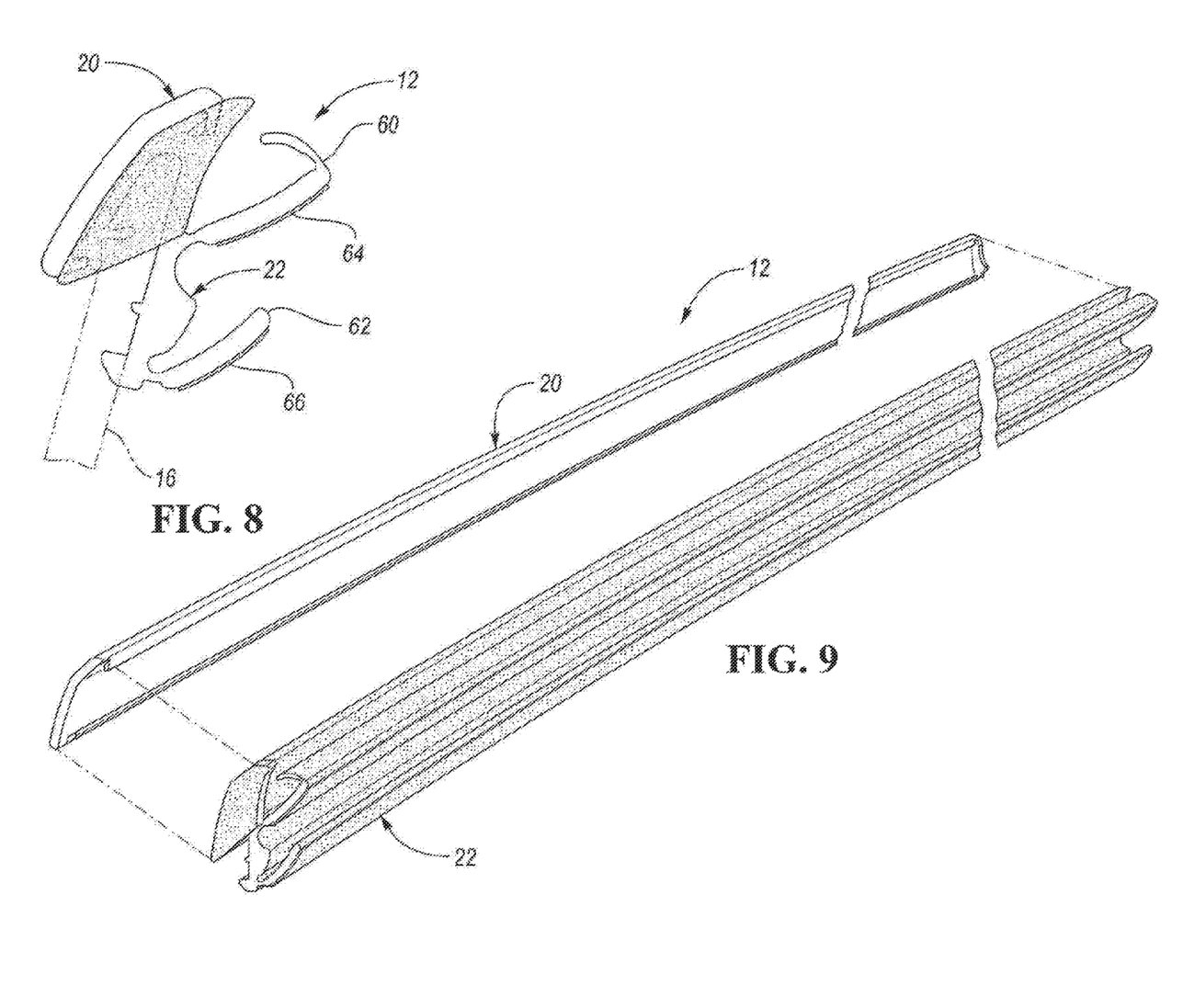
FIG. 8 is an end view of a trim assembly with a pane of glass indicated by phantom lines.
FIG. 9 is an exploded perspective view, partially broken away, of the trim assembly of FIG. 8.
Figures 10, 11:
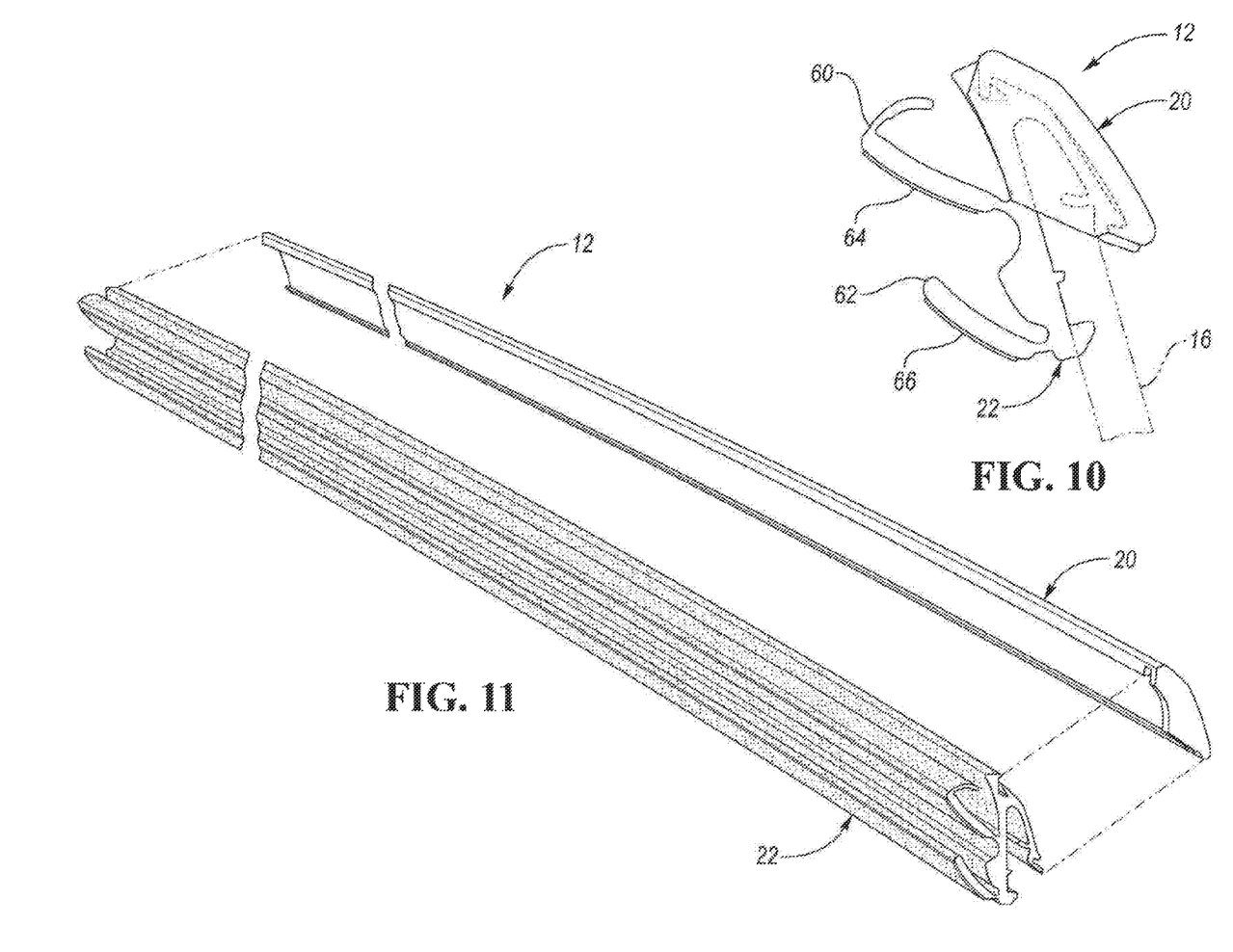
FIG. 10 is a view similar to the view of FIG. 8 but taken from a different angle.
FIG. 11 is a view similar to the view of FIG. 9 with the assembly of FIG. 10.

As shown in FIG. 4, the outer trim member 20 may include a polymer substrate 50 and a metallic layer 52 coated thereon. The outer trim member 20 of FIG. 4 maybe metal-plated. Plating on a thermoplastic such as ABS can serve to enhance the strength and structural integrity as well as to improve durability and thermal resistance resulting in metallic properties on the ABS material.

The metallic layer 52 may be chrome-plated and the plating may completely cover the polymer substrate 50. The molding or polymer substrate 50 typically is processed through numerous liquid/metal baths in order to chrome-plate the substrate 50. For example, the substrate 50 may first be dipped into an acid bath to prepare its surface to accept metal to be applied in a subsequent bath(s). After removal from the acid bath, the substrate 50 is rinsed in a bath and thereafter dipped into an electroplating bath such as a copper or nickel bath. After removal from this copper or nickel bath, rinsing may again occur in another bath, with the substrate 50 thereafter being dipped in a chrome bath for electroplating the substrate 50 with chrome. In short, a plurality of baths are utilized during the chrome plating processes, with the substrate 50 being moved from one bath to the next in serial fashion as the process progresses. The phrase(s) "chrome plated" and "chrome plating" as used herein refers to both actual chrome plating as well as any other material which may be applied that resembles chrome in appearance.

The upper and lower outer boundary portions 24 and 26 of the trim member 20 may be joined to the upper and lower outer boundary mating portions 30 and 32 of the seal 22, respectively, by a complementary rib 54 and a groove 56, in sealed mating relationship to withstand vibration and extreme weather conditions.

Each rib 54 may be inserted into its groove 56 for snap-fit engagement due to the resiliency of the seal 22 to retain the trim member 20 on the window seal 22.

The window seal 22 may include outer upper and lower lips, 60 and 62, respectively. Outwardly facing surfaces of the lips 60 and 62 are coated with a flock layer 64 and 66, respectively. The flock layers 64 and 66 can be formed as part of the extrusion process that forms the seal 22.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicular window trim assembly comprising:
a decorative outer trim member having upper and lower outer boundary mating portions formed on the perimeter of the trim member, wherein the outer trim member includes (i) an injection molded substrate integrally formed from a polymer material and (ii) a metallic layer that is coated on the substrate and that completely covers the substrate; and a channel-shaped window seal having a mouth to receive a panel-like member movable between an open position and a closed position, the window seal further having upper and lower outer boundary mating portions formed on the perimeter of the seal mateable in sealed relationship with the upper and lower outer boundary mating portions, of the trim member, respectively, to form an outer boundary, wherein the outer boundary mating portions of the trim member and the seal are joined together to form the outer boundary with the trim member and the seal being contiguous from the upper outer boundary mating portions along a part of the perimeters of the trim member and the seal towards the lower outer boundary mating portions and non-contiguous thereafter up to the lower outer boundary mating portions.

2. The assembly as claimed in claim 1, wherein the outer trim member is metal-plated.

3. The assembly as claimed in claim 1, wherein the metallic layer is chrome-plated.

4. The assembly as claimed in claim 1, wherein the polymer is a thermoplastic.

5. The assembly as claimed in claim 1, wherein the metallic layer is an electroplated layer.

6. The assembly as claimed in claim 4, wherein the thermoplastic is ABS.

7. The assembly as claimed in claim 1, wherein the upper and lower outer boundary mating portions of the trim member are joined to the upper and lower outer boundary mating portions of the seal, respectively, by a complementary rib and groove sealed mating relationship to withstand vibration and extreme weather conditions.

8. The assembly as claimed in claim 7, wherein each rib is inserted into its groove for snap-fit engagement to retain the trim member on the window seal.

9. A decorative molding assembly for a vehicle door frame having a window opening for a translating windowpane moveable between an open position and a closed position, the assembly comprising:

a decorative outer trim member having upper and lower outer boundary mating portions formed on the perimeter of the trim member, wherein the outer trim member includes (i) an injection molded substrate integrally formed from a polymer material and (ii) a metallic layer that is coated on the substrate and that completely covers the substrate; and a channel-shaped window seal having a mouth to receive the windowpane and upper and lower outer boundary mating portions formed on the perimeter of the seal mateable in sealed relationship with the upper and lower outer boundary mating portions of the trim member, respectively, to form an outer boundary, wherein the outer boundary mating portions of the trim member and the seal are joined together to form the outer boundary with the trim member and the seal being contiguous from the upper outer boundary mating portions along a part of the perimeters of the trim member and the seal towards the lower outer boundary mating portions and non-contiguous thereafter up to the lower outer boundary mating portions.

10. The assembly as claimed in claim 9, wherein the outer trim member is metal-plated.

11. The assembly as claimed in claim 9, wherein the metallic layer is chrome-plated.

12. The assembly as claimed in claim 9, wherein the polymer is a thermoplastic.

13. The assembly as claimed in claim 9, wherein the metallic layer is an electroplated layer.

14. The assembly as claimed in claim 12, wherein the thermoplastic is ABS.

15. The assembly as claimed in claim 9, wherein the upper and lower outer boundary mating portions of the trim member are joined to the upper and lower outer boundary mating portions of the seal, respectively, by a complementary rib and groove sealed mating relationship to withstand vibration and extreme weather conditions.

16. The assembly as claimed in claim 15, wherein each rib is inserted into its groove for snap-fit engagement to retain the trim member on the window seal.

17. The assembly as claimed in claim 1, wherein the seal includes a reinforcing carrier embedded within the mouth of the seal, the reinforcing carrier extending through the mouth of the seal to be adjacent opposite sides of the panel-like member when the panel-like member is received within the mouth of the seal.

18. The assembly as claimed in claim 17, wherein the reinforcing carrier has differing amounts of rigidity along its length.

19. The assembly as claimed in claim 9, wherein the seal includes a reinforcing carrier embedded within the mouth of the seal, the reinforcing carrier extending through the mouth of the seal to be adjacent opposite sides of the windowpane when the windowpane is received within the mouth of the seal.

20. The assembly as claimed in claim 19, wherein the reinforcing carrier has differing amounts of rigidity along its length.

* * * * *